(12) United States Patent
Hansen et al.

(10) Patent No.: US 6,669,814 B2
(45) Date of Patent: Dec. 30, 2003

(54) MULTI-PLY PAPERBOARD PREPARED FROM RECYCLED MATERIALS AND METHODS OF MANUFACTURING SAME

(75) Inventors: James K. Hansen, Alpharetta, GA (US); Richard L. Munson, Jr., Stroudsburg, PA (US); Roberto Balaguer, Jr., Saylorsburg, PA (US); Jeffrey M. Leitinger, Easton, PA (US); Thomas F. Barton, Eagan, MN (US)

(73) Assignee: Rock-Tenn Company, Norcross, GA (US)

( * ) Notice: Subject to any disclaimer, the term of this patent is extended or adjusted under 35 U.S.C. 154(b) by 0 days.

(21) Appl. No.: 10/107,897

(22) Filed: Mar. 26, 2002

(65) Prior Publication Data

US 2003/0168191 A1 Sep. 11, 2003

Related U.S. Application Data

(60) Provisional application No. 60/362,795, filed on Mar. 8, 2002.

(51) Int. Cl.$^7$ .......................... D21H 27/38; D21F 11/04; B32B 29/00
(52) U.S. Cl. .......................... 162/129; 162/132; 162/212
(58) Field of Search ................................. 162/123–133, 162/135–137, 4, 13, 141, 147, 149, 189, 191, 212, 214, 264, 265, 286, 298–301, 303, 304, DIG. 9, 315, 317; 428/34.1, 34.2, 34.6, 36.91, 153, 154, 211; 264/112, 113

(56) References Cited

U.S. PATENT DOCUMENTS

| | | | | |
|---|---|---|---|---|
| 4,021,295 A | * | 5/1977 | Schmaeng | 162/125 |
| 4,141,788 A | * | 2/1979 | Justus | 162/125 |
| 4,711,702 A | * | 12/1987 | Hood | 162/123 |
| 5,169,496 A | | 12/1992 | Wagle et al. | 162/129 |
| 5,173,356 A | | 12/1992 | Eaton et al. | 428/219 |
| 5,344,381 A | | 9/1994 | Cabrera y Lopez Caram | 494/56 |
| 5,665,205 A | | 9/1997 | Srivatsa et al. | 162/181.4 |
| 5,681,430 A | | 10/1997 | Neun et al. | 162/355 |
| 5,735,330 A | | 4/1998 | Buchmann et al. | 162/301 |
| 5,766,420 A | | 6/1998 | Cabrera y Lopez Caram | 162/354 |
| 5,820,735 A | | 10/1998 | Cabrera Y Lopez Caram | 162/354 |

(List continued on next page.)

FOREIGN PATENT DOCUMENTS

| | | | |
|---|---|---|---|
| WO | WO 97/08383 | 3/1997 | |
| WO | WO 97/30213 | 8/1997 | |
| WO | WO 98/10139 | 3/1998 | |
| WO | WO 99/61327 | 12/1999 | |
| WO | WO 99/61701 | * 12/1999 | D21F/11/04 |
| WO | WO 00/56975 | 9/2000 | |

OTHER PUBLICATIONS

Smook, G.A., Handbook for Pulp and Paper Technologists, Chapter 16, pp. 236–239 (1992).*

High–Quality Latex Polymers/Main Page. www.airproducts.com.

(List continued on next page.)

*Primary Examiner*—Peter Chin
*Assistant Examiner*—Eric Hug
(74) *Attorney, Agent, or Firm*—Needle & Rosenberg PC

(57) ABSTRACT

This invention, in one aspect, relates to a multi-ply paperboard having at least three inner plies and, in some aspects, a top liner and a back liner, wherein the multi-ply paperboard is derived from fiber sources comprising at least about 80% by weight recycled fiber. The multi-ply paperboard of the present invention exhibits strength characteristics comparable those of paperboard prepared from virgin board. In further aspects, the invention relates to methods of making the multi-ply paperboard of the present invention.

33 Claims, 2 Drawing Sheets

U.S. PATENT DOCUMENTS

| | | | |
|---|---|---|---|
| 5,830,322 A | 11/1998 | Cabrera y Lopez Caram et al. | 162/209 |
| 5,837,383 A | 11/1998 | Wenzel et al. | 428/486 |
| 5,922,173 A | 7/1999 | Neun et al. | 162/352 |
| 5,932,072 A | 8/1999 | Neun et al. | 162/352 |
| 5,951,823 A | 9/1999 | Cabrera Y Lopez Caram et al. | 162/352 |
| 6,030,501 A | 2/2000 | Neun et al. | 162/352 |
| 6,068,732 A | 5/2000 | Cassidy et al. | 162/123 |
| 6,080,278 A | 6/2000 | Heaven et al. | 162/198 |
| 6,092,003 A | 7/2000 | Hagart-Alexander et al. | 700/129 |
| 6,126,786 A | 10/2000 | White et al. | 162/209 |
| 6,241,848 B1 | 6/2001 | Hoffman | 162/4 |
| 6,309,717 B1 * | 10/2001 | Qiu et al. | 428/34.2 |
| 6,342,125 B1 * | 1/2002 | Nordstrom | 162/132 |

OTHER PUBLICATIONS

Riverwood International Corporation—Paperboard—Products—Aqua–Kote. www.riverwood.com.

Papermaking and Paperboard Operations. www.chem.vt.edu.

Forest Products: Preventing Strength Loss of Unbleached Kraft Fiber, www.oit.doe.gov.

AES, Cooperative Technology Improves Sheet Formation at Longview Fibre, www.aestf.com.

5.2.1 Fibers and Associated Material. www.paperloop.com (printed Dec., 2001).

TAPPI Test Methods, Internal tearing resistance of paper (Elmendorf–type method), pp. 1–8 (1987).

TAPPI Test Methods, Stiffness of paper and paperboard (Tabor–type stiffness tester), pp. 1–4 (1992).

Hunt, J.F., Know your fibers: Process and Properties, Presented at IMPEPA, Jun. 15, 1998.

Jaakko Pöyry Consulting, Inc., Recycled Fiber Opportunities. A Background Paper for a Generic Environmental Impact Statement on Timber Harvesting and Forest Management in Minnesota, prepared for Minnesota Environmental Quality Board (1992).

Paper Manufacture, Handbook of Printing Processes, Chapter 9, pp. 191–213.

* cited by examiner

MULTI-PLY PAPERBOARD PREPARED FROM RECYCLED MATERIALS AND METHODS OF MANUFACTURING SAME

CROSS REFERENCE TO RELATED APPLICATIONS

This application claims priority to provisional application 60/362,795 filed Mar. 8, 2002. The contents of this provisional application are incorporated herein in its entirety by this reference.

FIELD OF THE INVENTION

This invention relates generally to multi-ply paperboard prepared from recycled materials. The invention also relates to methods of making such multi-ply paperboard.

BACKGROUND OF THE INVENTION

Recycled materials are widely used in the manufacture of packaging products. This can be primarily due to the fact that virgin fibers can often be more expensive than fibers obtained from recycled materials. Furthermore, many consumers make purchasing decisions based upon whether a product is provided in a package made from recycled materials. Additionally, many agencies require products purchased for governmental purposes to be packaged using recycled materials.

Paperboard can be used to package a wide variety of materials. In keeping with the need to manufacture packaging materials from recycled materials, recycled paperboard is a desirable objective.

A common type of paperboard prepared from recycled fibers is known as "clay coated newsback" or "CCNB." CCNB is made by Rock-Tenn Company, Norcross, Ga. CCNB exhibits sufficient dry strength to enable its use as a packaging material. Accordingly, CCNB is commonly used to package materials that are generally stored in a dry state. In particular, dry strength is important, for example, to reduce deformation in the package and to therefore improve machineability of the package. Materials that may be packaged in CCNB include, for example, soap/laundry detergents, dry bakery goods, paper goods, cake mixes, cereal or other dry foods. However, CCNB generally does not exhibit dry strength comparable to virgin paperboard of a similar thickness, a fact that can limit its use in packaging certain products.

In some instances, the strength of a recycled paperboard material, such as CCNB, can be improved by increasing the thickness, or caliper, of the paperboard. However, increasing the thickness of a paperboard product can increase the cost of the packaging material and this additional cost may be passed on to the consumer. Accordingly, it is often not economical to attempt to improve the strength of a packaging material prepared from recycled material by increasing the thickness of the packaging material.

Strong packaging materials may be obtained by utilizing paperboard derived from virgin fiber. Because virgin fibers have not previously been subjected to processing (e.g., refining, pulping, processing, converting) or used in packaging material, such fibers can generally provide strong and durable paperboard packaging materials. However, as noted previously, the cost of virgin fibers can be high. As such, for many packaging applications it is often not economical to prepare paperboard from virgin fibers.

In view of the above, it would be beneficial to have a multi-ply paperboard prepared from recycled fibers that exhibits good strength, in particular dry strength. Also, it would be beneficial to have a multi-ply paperboard prepared from recycled materials that exhibits good machineability. More particularly, it would be desirable to have a multi-ply paperboard prepared from recycled materials that exhibits strength and machineability properties that are comparable to those of paperboard of the same or similar thickness that is prepared from virgin fiber.

SUMMARY OF THE INVENTION

This invention, in one aspect, relates to a multi-ply paperboard having at least three inner plies and, in some aspects, a top liner and/or back liner, wherein one or more plies of the multi-ply paperboard is derived from fiber sources comprising at least about 80% by weight recycled material. The multi-ply paperboard in various aspects of the present invention exhibits strength and/or machineability characteristics comparable to those of paperboard prepared from virgin fiber. In further aspects, the present invention relates to methods of making the multi-ply paperboard of the present invention.

Additional advantages of the invention are set forth in part in the description that follows, and in part will be evident from the description, or may be learned by practice of the invention. Various advantages of the invention will be realized and attained by means of the elements and combinations particularly pointed out in the appended claims. The foregoing general description and the following detailed description are exemplary and explanatory only and are not restrictive of the invention, as claimed.

The accompanying drawings, which are incorporated in and constitute a part of this document, illustrate several embodiments of the invention and together with the description, serve to explain the principles of the invention.

DETAILED DESCRIPTION

Figure 1:
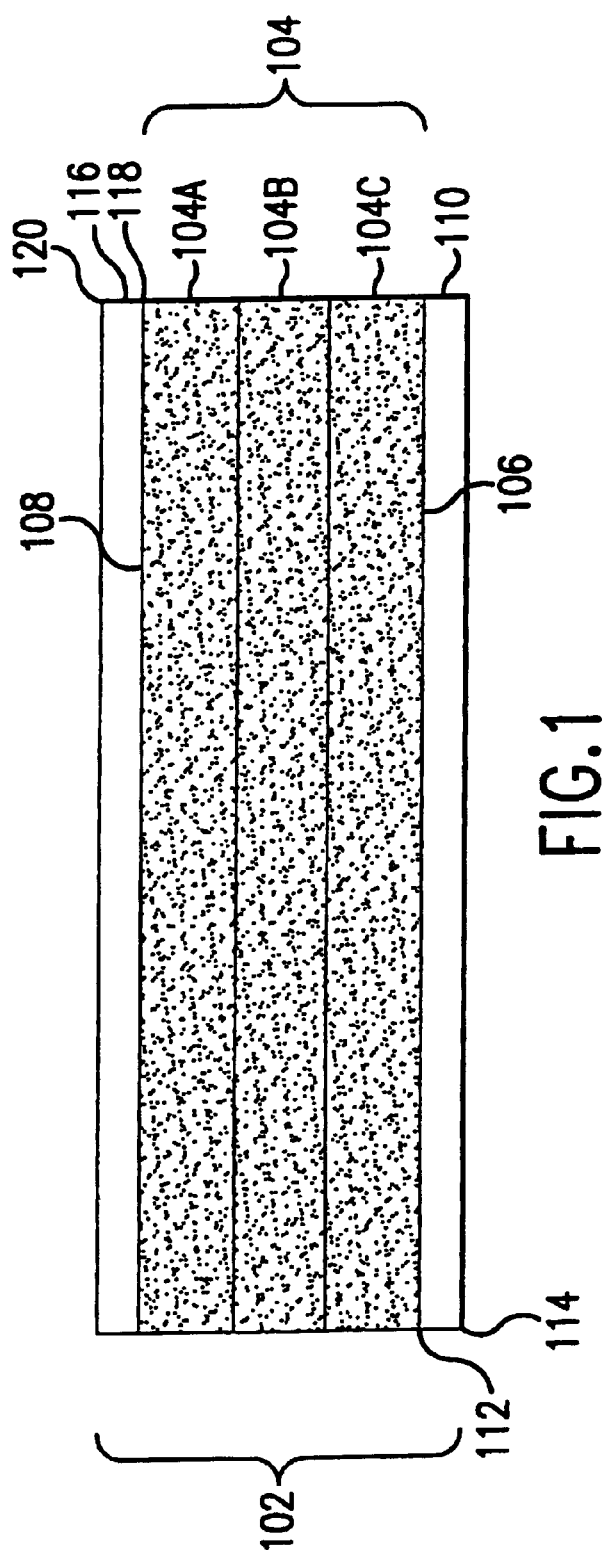
FIG. 1 provides a description of one aspect of a multi-ply paperboard product of the present invention.

As used in this document, the singular forms "a," "an" and "the" include plural referents unless the context clearly dictates otherwise. Thus, for example, reference to "an additive" includes mixtures of additives.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," the particular value forms another aspect. Furthermore, the endpoints of each of the ranges are significant both in relation to the other endpoint, and independently of the other endpoint.

Reference is made in this document to a number of terms that are defined as follows:

Parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not.

"Recycled multi-ply paperboard" means paperboard having one or more plies (or "layers") derived from a fiber source comprising recycled fiber.

"Recycled fiber" means fiber obtained by one or more recycling processes that would be generally recognized by those of ordinary skill in the art. In accordance with the present invention, the term "recycled" is synonymous with "recovered." Recycled fiber can be obtained from recycled material. Such fibers include those generated by both "post-consumer" and "pre-consumer" recycling processes. "Post-consumer fibers" means fibers obtained from paper or paperboard products that have been discarded for disposal or recovery after having completed their intended uses. Post-consumer fiber may be obtained from the sorting of materials from a consumer or manufacturer waste stream prior to disposal. "Pre-consumer fiber" means fiber obtained from any paper or paperboard scrap generated, for example, during a packaging manufacturing process. "Pre-consumer fiber" means fiber obtained from packaging materials that have been manufactured but are not suitable for use in packaging materials for quality or other reasons. Still further, "pre-consumer fiber" may include fiber obtained from the recycling of a waste stream in a mill process, that is, "mill broke."

"Virgin paperboard" means paperboard prepared from virgin fibers. "Virgin fibers" are fibers that have never before been utilized to prepare paper or paperboard. In one aspect, virgin fibers may be obtained directly from the processing of trees.

"Fiber source" means the fiber composition from which the pulp stock utilized in the plies of the multi-ply paperboard are prepared. A fiber source can be obtained from recycled material as discussed elsewhere herein. In particular, a fiber source can be utilized to prepare a pulp stock as set forth in more detail herein.

"Consistency" means the total amount of fiber in a pulp stock. For example, a pulp stock with a consistency of 3 parts has 3 parts total fiber out of a total of 100 parts water and fiber.

When reference is made to a particular part of recycled fiber in a pulp stock, the part refers to the amount of recycled fiber out of the total amount of fiber in the pulp stock. For example, where a pulp stock has a consistency of 3 parts fiber per 100 parts water and fiber and the amount of recycled fiber in the pulp stock is 80%, a balance of e.g., 20% of the fiber in the stock can be of another fiber type e.g., virgin fiber, to make up the total of 3 parts fiber in the pulp stock.

The length of a recycled fiber is measured prior to hydropulping and/or refining of the recycled fiber. That is, when a fiber length is described herein, the fiber length is in reference to the length of the fiber as received from a supplier and prior to any processing of the fiber to prepare a pulp for use to prepare the multi-ply paperboard of the present invention.

"Softwood fibers" means fibers derived from the wood of coniferous tree species.

"Hardwood fibers" means fibers derived from the wood of deciduous tree species.

"Chemically pulped fiber" is fiber that, from its virgin state (that is, prior to use in a paper or packaging material), is the product of a thermochemical digestion process whereby wood chips are combined in, for example, a pressure vessel, with lignin reactive chemical compounds such as, for example, an aqueous solution of sodium hydroxide, sodium sulfide and sodium sulfate and heated with steam. Over an interval of roughly 0.5 to 4.0 hours under pressures that may exceed 350 psi, the natural lignin binder of the plant cells is substantially hydrolyzed. In particular, chemically pulped fibers have been subjected to a process that reduces the natural lignin content of the fiber to 50% or less than that in the fiber before start of the pulping process. In one aspect, chemically pulped fiber may comprise fibers treated according to a kraft pocess ("sulfate process"), but other types of chemical treatment may be used in the invention herein.

"Mechanically pulped fiber" is fiber that, from its virgin state (that is, prior to use in a paper or packaging material), is prepared by mechanically cutting or abrading natural wood into particles of a fiber size suitable for use to prepare multi-ply paperboard. Mechanically pulped fiber may be subjected to one or more chemical or thermochemical processes, however, such processes are generally not sufficient to remove more than about 30% of the natural lignin content from the fiber.

When an element is "proximal" to another element, the elements are near each other. In some aspects, proximal may mean that the elements are adjacent to each other. In other aspects, proximal may mean that the elements are separated by a ply of the multi-ply paperboard.

The % or parts stated for any recycled material does not include any additives, coatings etc. that might be present in the recycled material as obtained from the supplier, or that might be present in the pulp stocks or other components of the invention.

The present invention relates broadly to high strength multi-ply paperboard wherein the fiber sources used to prepare at least one of the plies comprise recycled fiber. Further, the invention relates broadly to methods of making such multi-ply paperboard. In particular, in accordance with the present invention, it has been found that multi-ply paperboard may be prepared from recycled fiber where such paperboard exhibits strength properties comparable to those of paperboard prepared from virgin fiber.

In a major aspect, the invention herein comprises a multi-ply paperboard having at least three inner plies, wherein the inner plies together form a filler section of the multi-ply paperboard. The filler section has a first filler section side and a second filler section side.

Still further, the number of inner plies forming the filler section can be three or greater. Yet further, the number of inner plies may be at least 3, 4, 5, 6, 7, 8, 9 or more plies.

In one aspect, the at least three inner plies can each, independently, be derived from one or more fiber sources (hereinafter "inner ply fiber source") that can comprise at least about 80% by weight recycled fiber. Still further, the one or more inner ply fiber sources can comprise at least about 90% or at least about 95% by weight recycled fiber. Yet still further, the one or more inner ply fiber sources can comprise about 100% by weight recycled fiber. In a further aspect, the one or more inner ply fiber sources can consist essentially of recycled fiber. In some aspects, it is beneficial for each inner ply to be prepared using a single pulp stock comprising fiber sources as described elsewhere herein. However, in accordance with the present invention, it is contemplated that separate pulp stocks comprising different inner ply fiber sources can be used to prepare each inner ply, as long as such pulp stocks conform to the fiber parameters disclosed herein.

The fiber sources from which an inner ply is derived can comprise a first inner ply fiber. In particular, the inner ply fiber source can comprise from about 75 to about 100% by weight of a first inner ply fiber. In further aspects, the inner ply fiber source can comprise from about 75, 80, 85, 90, 95 or 100% by weight of a first inner ply fiber.

The first inner ply fiber can comprise from about 70 to about 100% by weight softwood fibers, with the balance, if any, comprising hardwood fibers. Still further, the first inner ply fiber can comprise from about 70, 75, 80, 85, 90, 95, 97, 99 or 100% softwood fibers, wherein any value may be used as a lower endpoint or an upper endpoint, as appropriate. As noted, the balance of fibers for the first inner ply fiber, if any, can comprise hardwood fibers.

In a further aspect, the first inner ply fiber can comprise at least about 80% by weight of a chemically pulped fiber. Still further, the first inner ply fiber can comprise at least about 90% or 95% or 100% by weight of a chemically pulped fiber. Still further, the first inner ply fiber can consist essentially of a chemically pulped fiber.

In a further aspect, the inner ply fiber source can comprise from at least about 0 to about 25 wt. % by weight of a second inner ply fiber. Still further, the inner ply fiber source can comprise from about 1, 5, 10, 15, 20 or 25% by weight of a second inner ply fiber, where any value may be used as an upper or a lower endpoint, as appropriate.

In one aspect, the second inner ply fiber can comprise at least about 80% by weight mechanically pulped fiber. Still further, the second inner ply fiber can comprise at least about 90% or 95% by weight mechanically pulped fiber. The second inner ply fiber can comprise 100% by weight mechanically pulped fiber. Yet still further, the second inner ply fiber can consist essentially of mechanically pulped fiber.

The second inner ply fiber, if any, can comprise at least about 80% by weight softwood fiber or at least about 90% by weight softwood fiber or at least about 95% by weight softwood fiber or about 100% by weight softwood fiber. Still further, the second inner ply fiber can consist essentially of softwood fiber.

In an aspect of the invention, the multi-ply paperboard exhibits strength comparable to that of a paperboard derived from a fiber source consisting essentially of or consisting of virgin fibers, wherein the virgin paperboard and the inventive multi-ply paperboard have a comparable thickness.

In particular, the multi-ply paperboard of the present invention can have a MD/CD stiffness ratio of from about 1.3 to about 2.3. The MD and CD stiffness values providing the ratio are measured in accordance with TAPPI method 489-om-92, the disclosure of which is incorporated herein in its entirety by this reference. As would be recognized by one of ordinary skill in the art, this method is an "official method" and, as such, this method meets TAPPI's requirement quality and precision as outlined in the regulations and style guidelines developed by the TAPPI Test Methods Subcommittee of the Quality and Standards Management Committee of TAPPI's Board of Directors.

Still further, the multi-ply paperboard of the present invention can have a MD/CD stiffness ratio of about 1.3, 1.4, 1.5, 1.6, 1.7, 1.8, 1.9, 2.0, 2.2 or 2.3, where any of the stated values may be utilized as an upper or lower endpoint, as appropriate. The MD/CD stiffness ratio can also be from about 1.5 to about 2.0. Still further, the MD/CD stiffness ratio can be less than about 2.3, 2.2, 2.1, 2.0 1.9 or 1.8.

The multi-ply paperboard of the present invention can be particularly well suited for packaging applications where high strength and/or good machineability is desired. It has been found that the multi-ply paperboard of the present invention may be substituted for paperboard prepared from virgin fibers of the same or similar caliper in a wide variety of applications.

In separate aspects, the MD stiffness value for the paperboard of the present invention can be from about 100 to about 1100. Still further, the MD stiffness value can be from about 100, 150, 200, 250, 300, 350, 400, 450, 500, 550, 600, 650, 700, 750, 800, 850, 900, 950, 1000, 1050 or 1100 where any value can be used as an upper or lower endpoint, as appropriate. In further aspects, CD stiffness value for the multi-ply paperboard of the present invention may be from about 50 to about 550. Still further, the CD stiffness value may be from about 50, 100, 150, 200, 250, 300, 350, 400, 450, 500 or 550, where a value can be used as an upper or a lower end point as appropriate.

The multi-ply paperboard of the present invention can comprise a variety of thicknesses or calipers. In particular, the multi-ply paperboard can have a range of thicknesses of from about 0.010 to about 0.050 in. Still further, the multi-ply paperboard of the present invention can have a thickness of from about 0.012 to about 0.040 in. Still further, the multi-ply paperboard can have a thickness of about 0.010, 0.015, 0.020, 0.025, 0.030, 0.035, 0.040, 0.045 or 0.050 in, where any of the stated values may be utilized as an upper or a lower endpoint, as appropriate.

Still further, the MD tear strength value of the multi-ply paperboard of the present invention may be from about 300 to about 900. Still further, the MD tear strength value may be from about 300, 350, 400, 450, 500, 550, 600, 650, 700, 750, 800, 850 or 900, where any value can be used as an upper or lower endpoint, as appropriate. Yet further, the CD tear strength value of the multi-ply paperboard of the present invention may be from about 300 to about 900. The CD tear strength value may be from about 300, 350, 400, 450, 500, 550, 600, 650, 700, 750, 800, 850 or 900, where any value can be used as an upper or lower endpoint as appropriate.

The tear strength of the multi-ply paperboard of the present invention is measured according to TAPPI method 414-om-88, the disclosure of which is incorporated herein in its entirety by this reference. This is an official method of measurement of paperboard properties as described elsewhere herein.

The multi-ply paperboard of the present invention can comprise a top liner and a back liner. The back liner can be disposed proximal to the first filler section surface. The top liner can be disposed proximal to the second filler section surface. The compositions of each of these layers are discussed separately below.

FIG. 1 depicts one aspect of a multi-ply paperboard in accordance with an aspect of the present invention as with the following sections, the following discussion in this section relates to this particular aspect and is non-limiting. In FIG. 1, the multi-ply paperboard 102 comprises at least three inner plies 104A, 104B and 104C that together made up a filler section 104. The filler section has first filler section surface 106 and a second filler section surface 108. A back liner 110 having an inner surface 112 and an outer surface 114 is disposed such that the back liner inner surface is adjacent to the first filler section surface 106. A top liner 116 having an inner surface 118 and an outer surface 120 is disposed such that the top liner inner surface is adjacent to the second filler section surface 108.

The fiber source from which the top liner 116 can be derived (hereinafter "top liner fiber source") comprises at least about 80% by weight recycled fiber. Still further, the top liner fiber source comprises at least about 90% by weight recycled fiber or at least about 95% by weight recycled fiber. Still further, the top liner fiber source comprises about 100% by weight recycled fiber. Yet still further, top liner fiber source consists essentially of recycled fiber.

The top liner fiber source can comprise from about 60 to about 95% by weight of a first top liner fiber and from about 40 to about 5% by weight of a second top liner fiber. Still further, the top liner fiber source comprises about 60:40, 65:35, 70:30, 75:25, 80:20, 85:15, 90:10, 95:5 or 99:1 by weight of first top liner fiber: second top liner fiber, where any of the stated ratios may be used as an upper or lower endpoint, as appropriate.

The first top liner fiber can comprise at least about 80% by weight of softwood fiber. Up to about 20% by weight hardwood fiber may be present in the first top liner fiber. Yet further, the first top liner fiber can comprise at least about 90% by weight of softwood fiber with the balance of fiber being hardwood fiber. Still further, the first top liner fiber can be derived from a fiber source comprising at least about 95% or about 99% by weight softwood fiber, with the balance of fiber being hardwood fiber. Still further, the first top liner fiber can consist essentially of softwood fiber.

In one aspect, the first top liner fiber can comprise at least about 80% by weight chemically pulped fiber. Still further, the first top liner fiber can comprise at least about 90% or 95% or about 100% by weight chemically pulped fiber. Yet still further, the first top liner fiber can consist essentially of chemically pulped fiber.

The second top liner can comprise at least about 20% or 15% or 10% or 5% or 1% by weight of a mechanically pulped fiber.

The second top liner fiber can comprise at least about 80% or 90% or 95% or 100% by weight of a softwood fiber. Still further, the second top liner fiber can consist essentially of softwood fiber.

The fiber source from which the back liner is derived (hereinafter "back liner fiber source") can comprise at least about 80% by weight recycled fiber. The back liner fiber source can also comprise at least about 90% or 95% by weight recycled fiber. Still further, the back liner fiber source can comprise about 100% by weight recycled fiber. Yet still further, the back liner fiber source can consist essentially of recycled fiber.

The back liner fiber can comprise at least about 80% or at least about 90% or at least about 95% by weight softwood fiber. Still further, the back liner fiber can comprise about 100% by weight softwood fiber. Yet still further, the back liner fiber consists essentially of softwood fiber.

In a further aspect, the back liner fiber can comprise at least about 80% by weight of a chemically pulped fiber. Still further, the back liner fiber can comprise at least about 90% or 95% or 100% by weight of a chemically pulped fiber. Yet still further, the back liner fiber consists essentially of chemically pulped fiber.

A further aspect of the present invention provides methods of making the multi-ply paperboard of the present invention. Such methods include the steps of: a) introducing an inner ply pulp stock into at least one fourdrinier-type machine having a pulp stock introduction point, a forming fabric and an induction means; b) directing the forming fabric away from the pulp stock introduction point, thereby draining water from the pulp stock via the induction means so as to provide at least one inner ply; and c) collecting the at least one inner ply with at least two additional inner plies to provide at least three inner plies, wherein the at least three inner plies are suitable for use in a multi-ply paperboard having at least three inner plies. The filler section can be incorporated in a multi-ply paperboard, wherein the multi-ply paperboard can have the MD and CD stiffness values and tear strengths discussed previously herein.

In accordance with the methods of the present invention, a back liner may be disposed proximal to the first filler section surface and a top liner may be disposed proximal to the second filler section surface.

The recycled fiber from which the multi-ply paperboard is derived can be obtained from a broker of recycled packaging materials. One of ordinary skill in the art would recognize that a number of sources of recycled material exist and may be readily located. One such source of recycled fiber is Rock-Tenn Company, Recycled Fiber Division (Norcross, Ga).

One of ordinary skill in the art would recognize that sources of recycled paper can vary considerably from lot to lot. However, in accordance with the present invention, it has been found possible to utilize such often variable sources of recycled material to reproducibly prepare a recycled multi-ply paperboard material with consistently good strength and/or good machineability characteristics.

The recycled material specified herein for the various plies is generally supplied in bales. These bales can be placed into a hydropulper to separate the fibers from the recycled material. Hydropulping methods known generally to one of ordinary skill in the art may be used in the invention herein. One hydropulping method suitable in the invention herein comprises agitating the recycled material in hot water at from about 110 to about 160° F., or at from about 130 to about 150° F., in a large vat known as a "hydropulper." The recycled material can be added to the vat and a beater action applied to the recycled material to separate the fibers from the other components of the recycled material. One of ordinary skill in the art would recognize that the time, temperature and energy needed to separate the fibers will normally be dependent upon the type of recycled material being used. However, such parameters can readily be determined without undue experimentation.

For all plies, the separated fibers and pulp stocks can be cleaned to remove impurities. Typical methods of cleaning include screening and centrifugation. Pressure screens can be used to remove larger debris, while centrifugal cleaners can be used to remove light debris such as, for example, glue and hot melt ("tackies" and "stickies"). Magnets can also be used to remove iron and steel from the fibers. Screens and/or gyro devices may be utilized to clean the pulp stocks, as required. One of ordinary skill in the art would recognize that the type and amount of cleaning necessary can be dependent on the prior use of the recycled materials. For example, post-consumer recycled material may need more cleaning than a recycled material obtained from, for example, packaging scrap. However, the cleaning methods suitable herein are well known to one of ordinary skill in the art and, as such, will not be discussed in further detail. The fibers may be subjected to 1, 2, 3, 4, or 5 or more cleaning steps, depending on the specifications of the end use and how contaminated the recycled material is when received from a supplier.

The fiber sources described previously can be utilized to prepare pulp stocks to prepare individual plies of the multi-ply paperboard. The methods of preparing each of these pulp stocks are discussed in detail below.

In certain aspects, it can be important that the pulping and refining steps be conducted so as to not result in significant loss of fiber length in the pulp stock. In particular, in some aspects, it is desirable to maintain the chemically treated fiber at substantially the same length as when it is obtained from the recycled material supplier. For example, if a chemically pulped fiber has a length of 2.0 mm in the recycled material from which it is derived, it can be beneficial to maintain or substantially maintain this fiber length during the hydropulping and refining processes disclosed herein for treatment of the recycled fiber prior to use in the paperboard manufacturing process disclosed herein. In accordance with these aspects, the length of a recycled fiber utilized herein is at least about 70% of the length of the fibers prior to the start of the hydropulping and refining processes. Still further, the length of a recycled fiber utilized herein is at least about 80% of the length of the fiber prior to the start of the hydropulping and refining processes. Still further, the length of a fiber utilized herein is at least about 90% of the length of a fiber prior to the start of the hydropulping and refining processes.

The top liner pulp stock comprising the top liner fiber source can be batch pulped at a temperature of from about 110 to about 160° F. Other temperatures suitable for pulping the top liner pulp stock can be 110, 120, 130, 140, 150 or 160° F., where any of the values may be used as an upper or lower endpoint, as appropriate. The top liner pulp stock may or may not be cleaned. The top liner fiber source can be pulped to provide a consistency of from about 3.0 to about 8.0 parts fiber per 100 parts water and fiber. Still further, the top liner fiber source can be pulped to provide a consistency of from about 4.0 to about 6.5 parts fiber per 100 parts water and fiber. Yet still further, the consistency of the top liner pulp stock can be from about 3.0, 3.5, 4.0, 4.5, 5.0, 5.5, 6.0, 6.5, 7.0, 7.5 or 8.0 parts fiber per 100 parts water and fiber, where any value may be used as an upper or a lower endpoint, as appropriate.

After pulping, the top liner pulp stock can be pumped into a chest for storage or it may be directed into a refining step. The top liner pulp stock can be refined at a temperature of from about 110 to about 160° F. Other temperatures suitable for refining the top liner pulp stock can be 110, 120, 130, 140, 150 or 160° F., where any of the values may be used as an upper or lower endpoint, as appropriate. The top liner pulp stock can be refined to provide a consistency of from about 1.0 to about 5.0 parts fiber per 100 parts water and fiber. Still further, the top liner pulp stock can be refined to provide a consistency of from about 2.0 to about 3.5 parts fiber per 100 parts water and fiber. Yet still further, the consistency of the top liner pulp stock can be from about 1.0, 1.5, 2.0, 2.5, 3.0, 3.5, 4.0, 4.5 or 5.0 parts fiber per 100 parts water and fiber, where any value may be used as an upper or a lower endpoint, as appropriate. The top liner pulp stock can be refined at from about 3.0 to about 7.0 kilometers/revolution (KM/Rev). In further aspects, the top liner pulp stock can be refined at from about 3.0, 4.0, 5.0, 6.0 or 7.0 KM/Rev. The energy applied to refine the top liner pulp stock can be from about 2 to about 3 Horsepower Days/Ton (HPDT).

After refining, the top liner pulp stock may be pumped into a chest for storage or directed to a machine for fabrication of the top ply pulp stock as discussed in more detail below.

The refining processes that may be utilized to prepare the top ply, as well as the other plies, of the multi-ply paperboard may be selected from a number of methods known to one of ordinary skill in the art. Generally, refining involves, for example, passing the pulp between spinning grooved metal disks to, for example, agitate, brush, cut and/or defibilate the fibers. This action on the fibers typically provides more surface area to the fibers, which, in turn, can provide more bonding sites between the fibers when the fibers are made into paperboard.

The back liner pulp stock comprising the back liner fiber source can be batch pulped at a temperature of from about 110 to about 160° F. Other temperatures suitable for pulping the back liner pulp stock can be 110, 120, 130, 140, 150 or 160° F., where any of the values may be used as an upper or lower endpoint, as appropriate. The back liner pulp stock can be pulped to a consistency of from about 3.0 to about 8.0 parts fiber per 100 parts water and fiber. Still further, the back liner pulp stock can be pulped to a consistency of from about 4.0 to about 6.5 parts fiber per 100 parts water and fiber. Yet still further, the back liner pulp stock can be pulped to a consistency of from about 3.0, 3.5, 4.0, 4.5, 5.0, 5.5, 6.0, 6.5, 7.0, 7.5 or 8.0 parts fiber per 100 parts water and fiber, where any value may be used as an upper or a lower endpoint, as appropriate.

After pulping, the back liner pulp stock can be pumped into a chest for storage or it may be directed into a refining step.

The back liner pulp stock can be refined at a temperature of from about 110 to about 160° F. Other temperatures suitable for refining the back liner pulp stock can be 110, 120, 130, 140, 150 or 160° F., where any of the values may be used as an upper or lower endpoint, as appropriate. The fiber comprising the back liner pulp can be refined to a consistency of from about 1.0 to about 5.0 parts fiber per 100 parts water and fiber. Still further, the back liner pulp stock can be refined to provide a consistency of from about 2.0 to about 3.5 parts fiber per 100 parts water and fiber. Yet still further, the back liner pulp stock can be refined to a consistency of from about 1.0, 1.5, 2.0, 2.5, 3.0, 3.5, 4.0, 4.5 or 5.0 parts fiber per 100 parts water and fiber, where any value can be used as an upper or a lower endpoint, as appropriate. The back liner pulp stock can be refined at from about 1.5 to about 5.5 KM/Rev. In further aspects, the top liner pulp stock can be refined at from about 1.5, 2.0, 3.0,4.0, 5.0 or 5.5 KM/Rev. The energy applied to refine the pulp stock can be from about 2 to about 3 HPDT.

After refining, the back liner pulp stock may be pumped into a chest for storage or directed to a machine for forming of the back ply as discussed in more detail below.

The inner ply pulp stock comprising the inner ply fiber source can be batch pulped at a temperature of from about 110 to about 160° F. Other temperatures suitable for pulping the inner ply pulp stock can be 110, 120, 130, 140, 150 or 160° F., where any of the values may be used as an upper or lower endpoint, as appropriate. The inner ply pulp stock can be pulped to provide a consistency of from about 3.0 to about 8.0 parts fiber per 100 parts water and fiber. Still further, the inner ply pulp stock can be pulped to provide a consistency of from about 2.0 to about 5.0 parts fiber per 100 parts water and fiber. Yet still further, the inner ply pulp stock can be pulped to consistency of from about 2.0, 2.5, 3.0, 3.5, 4.0, 4.5 or 5.0 parts fiber per 100 parts water and fiber, where any value may be used as an upper or a lower endpoint, as appropriate.

After pulping, the inner ply pulp stock can be pumped into a chest for storage or it may be directed into a refining step.

The inner ply pulp stock can be refined at a temperature of from about 110 to about 160° F. Other temperatures suitable for refining the inner ply pulp stock can be 110, 120, 130, 140, 150 or 160° F., where any of the values may be used as an upper or lower endpoint, as appropriate. The inner ply pulp stock can be refined to provide a consistency of from about 1.0 to about 5.0 parts fiber per 100 parts water and fiber. Still further, the inner ply pulp stock can be refined to a consistency of from about 2.0 to about 3.5 parts fiber per 100 parts water and fiber. Yet still further, the inner ply pulp stock can be refined to a consistency of from about 1.0, 1.5, 2.0, 2.5, 3.0, 3.5, 4.0, 4.5 or 5.0 parts fiber per 100 parts water and fiber, where any value may be used as an upper or a lower endpoint, as appropriate. The inner ply pulp stock can be refined at from about 6.0 to about 15.0 KM/Rev. In further aspects, the top liner pulp stock can be refined at from about 6.0, 8.0, 10.0, 12.0, 14.0 or 15.0 KM/Rev, where any value may be used as an upper or lower endpoint, as appropriate. The energy applied to refine the inner ply pulp stock may be from about 2 to about 3 HPDT.

After refining, the inner ply pulp stock can be pumped into a chest for storage or directed to a machine for fabrication of the inner plies as discussed in more detail below.

Each of the pulp stocks can comprise additives to improve the processing of the pulp stock and/or improve the end properties of the plies. Suitable additives are known to one of ordinary skill in the art and, as such, will not be described in detail herein. Generally, materials that can be used to improve the processing of the pulp stocks into the plies of the multi-ply paperboard include, but are not limited to, slimicides (used to control microbial growth), pH controls, retention aids (used to improve retention of fines and fillers) and drainage aids (used to improve water removal at the wet end). Further materials that can be used to improve the end properties of the multi-ply paperboard can include, but are not limited to, fillers (e.g. clay or talc to help improve optical and surface properties), starch (to augment dry strength properties of finished paperboard), wet strength resins (to improve tear properties of paperboard in damp and humid conditions), sizing agents (such as rosins to control penetration of liquids into finished paperboard) and fluorocarbons (to provide a grease barrier in finished paperboard). The amounts that each of these additives may be added are known to one of ordinary skill in the art or can be determined without undue experimentation and, as such, will not be described in detail herein.

In order to prepare the individual plies that form the multi-ply paperboard, separate machines can be utilized to form each ply. Each of these separate processes are discussed in detail below.

The top liner and back liner can be prepared using a number of different machine types including, but not limited to, fourdrinier machines, compact ultraformers, cylinder vat or pressure formers, as long as the machines are capable of providing components of a multi-ply paperboard with the characteristics specified herein. The top liner and back liner can be formed using the same or different machine types.

In particular aspects of the present invention, both the back liner and the top liner can be prepared using a pressure former. Two pressure formers suitable for use in the present invention are a Horne former or a BRDA former but, as would be recognized by one of ordinary skill in the art, other types of pressure formers may be utilized without departing from the present invention. Such machines generally introduce pulp stock onto a cylinder by means of a pressurized explosion chamber and a forming zone. Water from the pulp stock can flow through a mesh surface on the cylinder so as to leave fibers attached to the surface of the cylinder as the cylinder rotates. As the cylinder rotates, the ply can be continuously transferred to a moving felt on a soft rubber couch roll.

According to particular aspects of the present invention, the top liner pulp stock can be introduced into a pressure former at from about 8 to about 22 lb/1000 ft$^2$ (MSF) at a consistency of from about 0.25 to about 1.75 parts fiber per 100 parts water and fiber. Still further, the top liner pulp stock can be introduced into a pressure former at from about 8, 10, 12, 14, 16, 18, 20 or 22 MSF, where any of the stated values can be used as an upper or lower endpoint, as appropriate. In further aspects, the top liner pulp stock can be introduced into a pressure former at a consistency of from about 0.25, 0.3, 0.4, 0.5, 0.6, 0.80, 0.90, 1.0, 1.1, 1.2 or 1.3 parts fiber per 100 parts water and fiber, where any of the stated values can be used as an upper or lower endpoint, as appropriate.

In particular aspects of the invention herein, the back liner pulp stock can be introduced into a pressure former at from about 10 to about 30 lb/MSF at a consistency of from about 0.25 to about 1.75 parts fiber per 100 parts water and fiber. Still further, the back liner pulp stock can be introduced into a pressure former at from about 10, 12, 14, 16, 18, 20, 22, 24, 26, 28 or 30 lb/MSF, where any of the stated values can be used as an upper or lower endpoint, as appropriate. In further aspects, the back liner pulp stock can be introduced into a pressure former at a consistency of from about 0.25, 0.30, 0.4, 0.5, 0.6, 0.7, 0.8, 0.9, 1.0, 1.1, 1.2, 1.3, 1.4, 1.5, 1.6 or 1.75 parts fiber per 100 parts water and fiber, where any of the stated values can be used as an upper or lower endpoint, as appropriate.

One of ordinary skill in the art will recognize that water removal from the pulp stocks can be augmented by addition of a vacuum to the pulp stock as it moves along the cylinder. While the optimal amount of vacuum desirable to dewater the pulp stock may be readily determined by one of ordinary skill in the art, in some aspects, the amount of vacuum that may be used is from about 0 to about 75 or from about 25 to about 50 inches of water.

Upon formation of the back liner and top liner, the plies are joined with the filler section as discussed in detail below.

Figure 2:
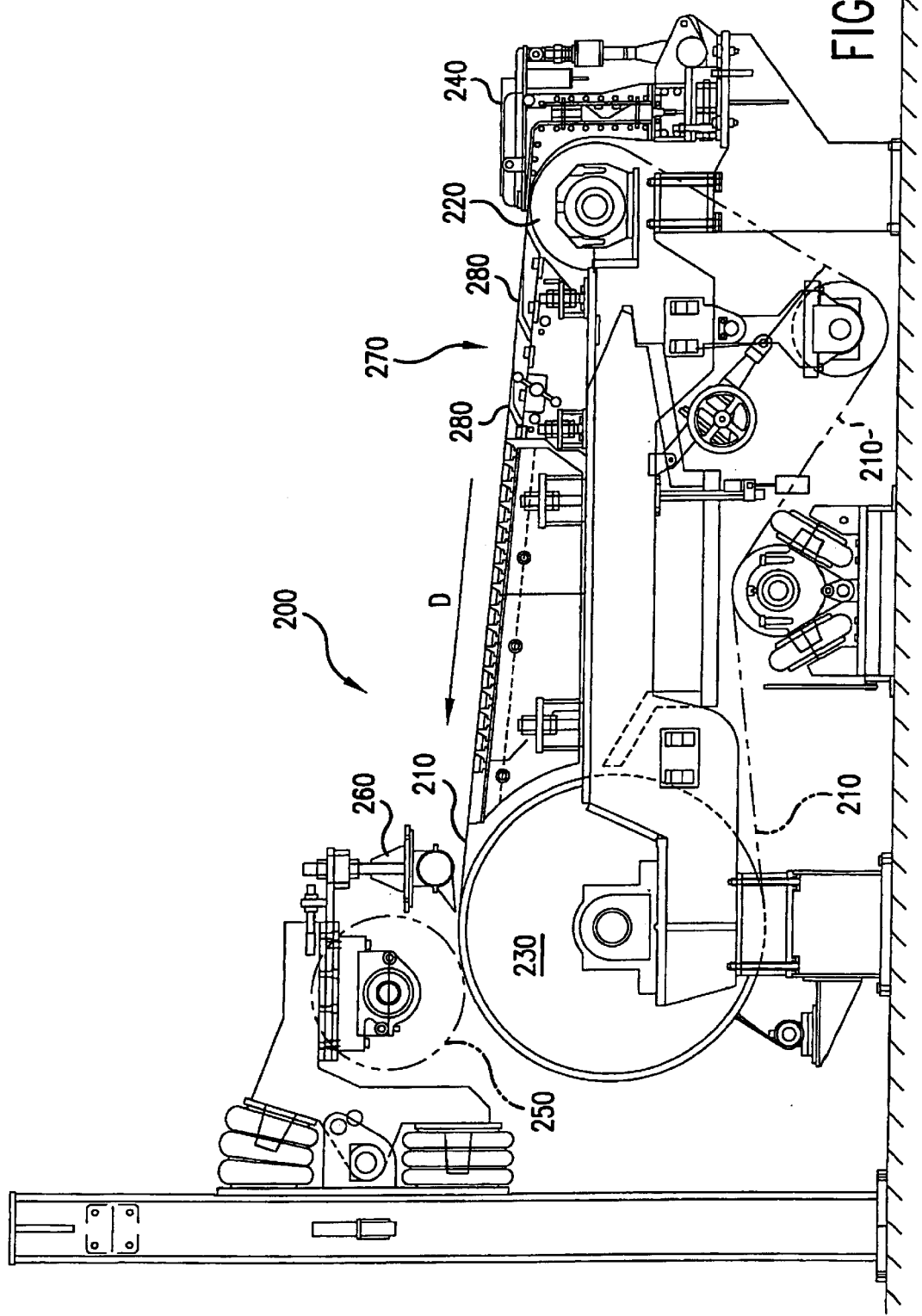
FIG. 2 provides a schematic description of a device that can be used to prepare one aspect of the paperboard of the present invention.

One or more of the at least three inner plies that comprise the filler section can be prepared using a fourdrinier-type forming device, one type of which is illustrated in FIG. 2. The fourdrinier-type machine illustrated in FIG. 2 is available commercially from Kadent AES (Queensbury, N.Y.) under the designation "FC Former®." One of ordinary skill in the art would recognize that a fourdrinier machine 200 utilizes a fabric 210, hereinafter ("forming fabric") which is an endless finely woven belt, usually a synthetic monofilament, or sometimes a wire, that travels between two large rollers 220, 230 in the direction indicated by the arrow "D". The first roller is the breast roller 220 and is located below the headbox 240. As the inner ply pulp stock is applied to the forming fabric 210, the fibers begin to lie on the forming fabric 210 as water pours through the mesh. A couch roller 250 located at the end of the forming fabric 210 is sometimes hollow and perforated. Attached to the couch roller 250 is a suction box 260 that assists in dewatering each of the inner plies that comprise the filler section.

In accordance with particular aspects of the present invention, in order to obtain greater strength properties in the multi-ply paperboard, it can be beneficial to use separate fourdrinier machines 200 to prepare each of the inner plies.

When there are three inner plies, there can be three separate fourdrinier machines 200, when there are five inner plies, there can be five fourdrinier machines 200, etc.

In further aspects, it can be beneficial to utilize one or more separate fourdrinier machines 200 that have been modified by addition of means for inducing stock activity of the inner ply pulp stock as it moves along the belt during a dewatering step. One having ordinary skill in the art will recognize that a plurality of means may be utilized to induce stock activity in a fourdrinier-type machine. Illustrative examples of such means include, but are not limited to, velocity induced drainage, activity lips, step foils, and lead-in dewatering elements.

In accordance with the present invention, stock activity may be improved by utilizing induction methods capable of applying "velocity induced drainage" in the pulp stock. Velocity Induced Drainage ("VID") is described in detail in U.S. Pat. Nos. 5,922,173, 5,932,072, 5,951,823 and 6,030,501, the disclosures of which are incorporated herein in their entireties by this reference for the disclosure in each of VID and methods and machinery suitable for use therein.

As noted, one fourdrinier-type machine that can provide VID is a FC Former® device. This device is believed to provide increased stock activity in a pulp because of the specially designed VID blade 270. The VID blade assembly 270 in the illustrated embodiment comprises two VID blades 280. In other embodiments, the VID blade assembly 270 may comprise one VID blade 280, or may comprise more than one VID blade 280, such as the illustrated embodiment or other embodiments having a plurality of VID blades 280, such as 3, 4, 5, or more VID blades 280, such as the structure and operation of the VID blade 270 and the resulting stock activity improvement is described in detail in one or more of the U.S. Patents referenced above.

While the fourdrinier-type machines disclosed herein can specifically be used to prepare the multi-ply paperboard herein, it is contemplated that other recently developed methods for inducing stock activity such as those disclosed in U.S. Pat. No. 5,830,322, the disclosure of which is incorporated herein in its entirety by this reference for its disclosure of stock activity induction and the methods and machinery thereof. The stock activity may also be modified by allowing the stock to pass over an activity lip as it moves from the headbox to the forming fabric, such a method is disclosed in U.S. Pat. No. 5,766,420, the disclosure of which is incorporated herein in its entirety by this reference for its disclosure of stock activity induction and the methods and machinery thereof. Any suitable method for inducing stock activity may be utilized either alone or in combination with one or more other suitable stock activity induction methods. Furthermore, it is understood by the inventors herein that significant research is currently being conducted in the area of inducing stock activity in pulp stock. As such, it is contemplated that any future developed methods of inducing stock activity in a pulp stock may be suitable for making the multi-ply paperboard of the present invention.

Without being bound by theory, it is believed that by using recently developed methods of inducing stock activity in a pulp stock, in particular using newly developed stock activity induction methods, previously unknown flow characteristics are provided in the pulp stock solution in a fourdrinier-type machine. In accordance with the invention herein, the use of such newly developed induction methods, in particular VID, have been found to allow the use of recycled fibers to provide multi-ply paperboard with previously unknown high strength and/or good machineability. It is believed that VID provides increased fiber activity early in the forming process so as to reduce the possibility of a drainage restrictive fiber mat on the forming fabric.

In one aspect, it has been found possible to prepare multi-ply paperboard from recycled fiber utilizing much smaller fourdrinier-type papermaking machines than utilized in the prior art to make multi-ply paperboard. In particular, VID mechanisms, such as that provided by a VID blade 280 as illustrated in FIG. 2, provide previously unknown properties in multi-ply paperboard prepared from recycled fiber.

Moreover, the present invention can allow marked economies. In particular, the capital outlay for equipment for the present invention can be several times less than that required to prepare multi-ply fourdrinier paperboard products according to prior art methods.

In additional aspects of the present invention, the pulp stock can be introduced onto the forming fabric at a velocity ("velocity A") which is greater than the velocity ("velocity B") at which the forming fabric is moving. In such aspects, the pulp stock is introduced onto the forming fabric 210 at a velocity that is at least about 1, 5, 10, 20 or, 30% faster than the velocity at which the forming fabric 210 is moving. In one non-limiting example, if the forming fabric 210 is moving at least about 300 feet per minute, the pulp stock may be introduced onto the forming fabric at 5% faster than 300 feet per minute, or at least about 315 feet per minute. Without being bound by theory, it is believed that the use of such velocities in combination with the induction methods described herein provides previously unknown benefits that, in some aspects, provides a high strength and/or good machineability multi-ply paperboard derived substantially from recycled materials.

As with the top liner and back liners, one of ordinary skill in the art would recognize that dewatering of the pulp stock may be improved through use of a vacuum device. In accordance with this aspect, the vacuum applied may be as described previously. Further, in preparing the inner plies, multiple zones of vacuum pressure may be applied to the pulp stock so as to improve dewatering. In particular, there can be two zones of applied vacuum in the VID section and three zones of applied vacuum in the flat box section of the fourdrinier-type machine.

After being subjected to an optional pressing step, the multi-ply paperboard web can be sent to a dryer section. Any drying method used generally to dry multi-ply paperboard may be used in the invention herein. One suitable method involves conveying the sheet through a dryer section where residual water can be removed by evaporation.

The dried fiber web may or may not be sized pressed. Size pressing generally involves applying a coating of starch or sizing resin to the surface (top, bottom or both) of the paperboard. Such methods are not crucial to the claimed invention and as such, will not be discussed in detail herein.

The dried fiber web can then be subjected to a pre-coat calendaring step. In this step, a starch solution can be applied on a wet stack calendar (in addition to or instead of applications on a size press for fourdrinier machines).

The multi-ply paperboard of the present invention can optionally be coated. Coating can result in some increase in strength of the finished multi-ply paperboard. However, in accordance with the present invention, it has been found that substantially all or all of the strength improvements seen with the multi-ply paperboard of the present invention will be conferred prior to coating of the paperboard.

In addition to coating, if any, the multi-ply paperboard may be treated to improve its printability or to increase its water repellency. Such treatments are well known to one of ordinary skill in the art and, as such, will not be discussed in detail herein.

In significant aspects of the present invention, the multi-ply paperboard is suitable for use as cartonboard. Still further, multi-ply paperboard of the present invention is suitable for use as folding boxboard. Cartonboard and folding boxboard are suitable for packaging consumer products such as, for example, food, cigarettes, milk and pharmaceuticals. In accordance with the present invention, the multi-ply paperboard prepared herein meets the requirements for cartonboard of a certain level of mechanical strength, stiffness and/or machinability. Accordingly, the multi-ply paperboard of the present invention exhibits one or more of the following properties: compression strength, minimal bulging when formed into a package, good bonding stiffness, especially in the cross machine direction and a relatively low basis weight.

In further significant aspects, the multi-ply paperboard of the present invention is scorable. By "scorable" it is meant the process of making an impression or partial cut in the flat multi-ply paperboard material for the purpose of making a folding carton. In accordance with the present invention, the multi-ply paperboard is scorable with substantially no delamination of the layers or breaking of the board. "Delamination" means separation or splitting of the individual layers of the multi-ply paperboard. Delamination and breakage makes a multi-ply paperboard less suited for use for folding carton applications.

The multi-ply paperboard prepared according to the present invention may be utilized in a number of different applications. In specific non-limiting examples, packaging materials in the form of a box, cup, tray, plate, can, tube, bottle "blister-pack" or other container form may be prepared from the multi-ply paperboard of the present invention. Materials packaged therein may be consumer goods. In separate examples, the packaging materials may be used for both food and non-food packaging. As examples of food that may suitably be packaged in materials treated with the compositions and methods of the present invention, the following non-limiting examples are presented: sweets, chocolate, confectionery, pastries, biscuits, dairy products (e.g, butter and cheese), powdery foodstuffs (e.g., coffee, tea, cocoa, flour, cereals), frozen food (e.g., ice cream, pastries, vegetables, seafood), fresh and semipreserved foods, pet food or carryout foods. Non-limiting examples of non-food packaging that may suitably be packaged in materials treated with the compositions and methods of the present invention include: cosmetics, toiletries, pharmaceuticals, cigarettes, detergents, textiles, toys, games, tools, household appliances, pesticides, fertilizers, hobby items, paper products, cassettes, record sleeves, hardware, such as, for example, nails and screws, and auto parts.

Converting methods known generally in the art may be utilized to form the packaging materials of the present invention. For example, the packaging material may be fabricated into a box configuration, a tube (shell) configuration, a tray configuration, or a bottle wrap configuration.

A wide variety of products can be packaged in packages fabricated from the multi-ply paperboard of the present invention. The multi-ply paperboard can be used to fabricate packaging materials to package products in which recycled multi-ply paperboard has previously been used. Moreover, since the multi-ply paperboard of the present invention exhibits excellent strength ie. stiffness and tear, it is well suited for uses to which prior art multi-ply paperboard prepared from recycled fiber may not have been suitable for use.

In significant aspects, the multi-ply paperboard of the present invention is particularly well suited for packaging heavy items where the cost of a virgin paperboard can be an aspect of the cost of the product. It can be beneficial to utilize packaging materials that are of a high strength but of a lower cost than virgin paperboard materials.

Still further, the multi-ply paperboard of the present invention has the same or similar thickness as a multi-ply paperboard prepared from virgin fiber. As such, the multi-ply paperboard of the present invention may be readily substituted in packaging applications where virgin paperboard is generally used. This allows existing packaging materials, methods and equipment to be useable with the paperboard of the present invention.

EXPERIMENTAL

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° F. or is at room temperature, and pressure is at or near atmospheric.

Multi-ply paperboard was prepared of various calipers according to the methods discussed herein. In particular, the fiber types used in the pulp stocks and the other relevant parameters were as follows:

Top liner fiber=about 80% chemically pulped softwood fiber
   about 20% mechanically pulped softwood fiber
Top liner pulp consistency=5.0%
Top liner refining consistency=2.1%
Back liner fiber=100% chemically pulped softwood fiber
Back liner pulp consistency=5.0%
Back liner refining consistency=33%
Inner ply fiber having at least about 80% recycled fiber content)=>80% chemically pulped softwood fiber and <20% mechanically pulped softwood fiber
Inner ply pulp consistency=4.0%
Inner ply refining consistency=3.0%

As would be readily recognized by one of ordinary skill in the art, the calipers were varied by applying additional pulp stock to the forming fabric so as to provide additional pulp stock in the paper web.

The inner plies were prepared on a modified fourdrinier-type (FC Former®) machine. The top liner and back liner were prepared using pressure former devices.

TABLE 1

STIFFNESS VALUES OF MULTI-PLY PAPERBOARD

| Caliper<br>Sample | | 0.014<br>A | 0.016<br>B | 0.018<br>C | 0.020<br>D | 0.022<br>E | 0.024<br>F | 0.026<br>G | 0.028<br>H | 0.030<br>I | 0.032<br>J | 0.034<br>K |
|---|---|---|---|---|---|---|---|---|---|---|---|---|
| Comp. Exs.<br>1A–1K | CD Stiffness | 85 | 110 | 150 | 190 | 240 | 290 | 350 | 395 | 475 | NT | NT |
| | MD Stiffness | 160 | 210 | 290 | 375 | 465 | 580 | 705 | 815 | 955 | NT | NT |
| Comp. Ex.<br>2A–2K | CD Stiffness | 80 | 100 | 140 | 165 | 210 | 275 | 325 | 395 | 475 | NT | NT |
| | MD Stiffness | 155 | 210 | 290 | 355 | 450 | 560 | 680 | 815 | 955 | NT | NT |
| Comp. Ex.<br>3A–3K | CD Stiffness | NT | 61 | NT | 98 | NT | 155 | NT | 222 | NT | NT | NT |
| | MD Stiffness | NT | 172 | NT | 286 | NT | 456 | NT | 666 | NT | NT | NT |
| Ex. A–K | CD Stiffness | 65 | 82 | 120 | 130 | 180 | 230 | 270 | 330 | 350 | 375 | 450 |
| | MD Stiffness | 125 | 170 | 240 | 285 | 370 | 470 | 545 | 700 | 790 | 870 | 1050 |

Comp. Ex. 1 = CNK ® (Mead Corporation, Dayton, OH)
Comp. Ex. 2 = SUS ® (Riverwood International, Atlanta, GA)
Comp. Ex. 3 = Clay Coated Newsback (Classic News ®, Rock-Tenn Company, Norcross, GA)
A–K = Inventive multi-ply paperboard
NT = Not Tested

TABLE 2

MD/CD STIFFNESS RATIO VALUES OF MULTI-PLY PAPERBOARD

| Caliper<br>Sample | 0.014<br>A | 0.016<br>B | 0.018<br>C | 0.020<br>D | 0.022<br>E | 0.024<br>F | 0.026<br>G | 0.028<br>H | 0.030<br>I | 0.032<br>J | 0.034<br>K |
|---|---|---|---|---|---|---|---|---|---|---|---|
| Comp. Exs.<br>1A–1K | 1.88 | 1.91 | 1.93 | 1.97 | 1.94 | 2.00 | 2.01 | 2.06 | 2.01 | NT | NT |
| Comp. Ex.<br>2A–2K | 1.94 | 2.10 | 2.07 | 2.15 | 2.14 | 2.04 | 2.09 | 2.06 | 2.01 | NT | NT |
| Comp. Ex.<br>3A–3K | NT | 2.82 | NT | 2.92 | NT | 2.94 | NT | 3.00 | NT | NT | NT |
| Ex. A–K | 1.92 | 2.07 | 2.00 | 2.19 | 2.06 | 2.04 | 2.02 | 2.12 | 2.26 | 2.32 | 2.33 |

Comp. Ex. 1 = CNK ® (Mead Corporation, Dayton, OH)
Comp. Ex. 2 = SUS ® (Riverwood International, Atlanta, GA)
Comp. Ex. 3 = Clay Coated Newsback (Classic News ®, Rock-Tenn Company, Norcross, GA)
A–K = Inventive multi-ply paperboard
NT = Not Tested The MD and CD stiffness values in Tables 1 and 2 were measured using TAPPI method 489-om-92.

The above table demonstrates that the multi-ply paperboard of the present invention exhibits strength properties, as reflected by the MD/CD stiffness ratio, that are comparable to a multi-ply paperboard prepared from virgin fibers (Comparative Examples 1A–1H and 2A–2H) of the same or similar thickness. In particular, the Comparative Examples falling under category 3, which are CCNB, have significantly higher MD/CD stiffness ratios than Examples A–K. Such higher ratios mean that CCNB exhibits a lower dry strength and less machineability than the multi-ply paperboard of the present invention.

TABLE 3

DRY TEAR STRENGTH MEASUREMENTS

| Caliper<br>Sample | | 0.014<br>A | 0.016<br>B | 0.018<br>C | 0.020<br>D | 0.022<br>E | 0.024<br>F | 0.026<br>G | 0.028<br>H | 0.030<br>I | 0.032<br>J | 0.034<br>K |
|---|---|---|---|---|---|---|---|---|---|---|---|---|
| Comp. Exs.<br>1A–1K | CD Dry Tear | 360 | 420 | 460 | 525 | 575 | 650 | 700 | 750 | 800 | NT | NT |
| | MD Dry Tear | 350 | 400 | 450 | 500 | 550 | 610 | 660 | 710 | 760 | NT | NT |
| Comp. Ex.<br>2A–2K | CD Dry Tear | 345 | 400 | 450 | 495 | 550 | 610 | 660 | 730 | 775 | NT | NT |
| | MD Dry Tear | 305 | 360 | 410 | 455 | 510 | 570 | 620 | 700 | 730 | NT | NT |

TABLE 3-continued

DRY TEAR STRENGTH MEASUREMENTS

| Caliper | | 0.014 | 0.016 | 0.018 | 0.020 | 0.022 | 0.024 | 0.026 | 0.028 | 0.030 | 0.032 | 0.034 |
| --- | --- | --- | --- | --- | --- | --- | --- | --- | --- | --- | --- | --- |
| Sample | | A | B | C | D | E | F | G | H | I | J | K |
| Ex. A–K | CD Dry Tear | 330 | 400 | 440 | 490 | 560 | 600 | 650 | 730 | 780 | 830 | 884 |
| | MD Dry Tear | 300 | 360 | 430 | 450 | 520 | 570 | 620 | 700 | 720 | 770 | 820 |

Comp. Ex. 1 = CNK ® (Mead Corporation, Dayton, OH)
Comp. Ex. 2 = SUS ® (Riverwood International, Atlanta, GA)
Ex. A–K = Inventive Multi-ply paperboard
NT = Not Tested The dry tear strength values was measured according to TAPPI method 414-om-88.

The above data show that the inventive paperboard of the present invention demonstrates dry tear strength comparable to multi-ply paperboard prepared from virgin fibers.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope of the invention. Other aspects of the invention will be apparent to those skilled in the art from consideration of the specification and practice of the invention disclosed herein. It is intended that the specification and examples be considered as exemplary only.

What is claimed is:

1. A multi-ply paperboard having at least three inner plies wherein the inner plies together form a filler section having a first filler section side and a second filler section side, wherein the inner plies are derived from one or more inner ply fiber sources comprising at least about 80% by weight recycled fiber, wherein the MD/CD stiffness ratio of the multi-ply paperboard is from about 1.3 to about 2.3, wherein the values providing the ratio are measured according to TAPPI method 489-om-92, wherein the multi-ply paperboard is scorable, and wherein the paperboard has a thickness of from about 0.010 to about 0.050 in.

2. The multi-ply paperboard of claim 1, wherein the one or more inner ply fiber sources each, independently, consist essentially of the recycled fiber.

3. The multi-ply paperboard of claim 1, wherein the MD/CD stiffness ratio is from about 1.5 to about 2.1.

4. The multi-ply paperboard of claim 1, wherein the MD/CD stiffness ratio is from about 1.75 to about 2.0.

5. The multi-ply paperboard of claim 1 having a thickness of from about 0.012 to about 0.040 in.

6. The multi-ply paperboard of claim 1, wherein the one or more inner ply fiber sources each, independently, comprise from about 75 to about 100% by weight of a first inner ply fiber and from about 25 to about 0% by weight of a second inner ply fiber.

7. The multi-ply paperboard of claim 6, wherein either or both of the first inner ply or the second inner ply fibers each, independently, comprise at least about 80% by weight softwood fiber.

8. The multi-ply paperboard of claim 6, wherein the first inner ply fiber comprises at least about 80% by weight chemically pulped fiber.

9. The multi-ply paperboard of claim 6, wherein the second inner ply fiber comprises at least about 80% by weight mechanically pulped fiber.

10. The multi-ply paperboard of claim 1, comprising:
(a) a back liner having an inner back liner side and an outer back liner side, wherein the inner back liner side is disposed proximal to the first filler section side, and wherein the back liner is derived from a back liner fiber source; and
(b) a top liner having an inner top liner side and an outer top liner side, wherein the inner top liner side is disposed proximal to the second filler section side, and wherein the top liner is derived from a top liner fiber source,
wherein the back liner fiber source and the top liner fiber sources each, independently, comprise at least about 80% by weight recycled fiber.

11. The multi-ply paperboard of claim 10, wherein either or both of the top liner or back liner fiber sources each, independently, consist essentially of recycled fiber.

12. The multi-ply paperboard of claim 10, wherein either or both of the top liner or back liner fiber source each, independently, comprise at least about 80% by weight softwood fiber.

13. The multi-ply paperboard of claim 10, wherein the top liner fiber source comprises from about 60 to about 95% by weight of a first top liner fiber and from about 40 to about 5% by weight of a second top liner fiber.

14. The multi-ply fiber of claim 13, wherein the first top liner fiber comprises at least about 80% by weight chemically pulped fiber.

15. The multi-ply paperboard of claim 13, wherein the second top liner fiber comprises at least about 80% by weight mechanically pulped fiber.

16. The multi-ply paperboard of claim 10, wherein the back liner fiber source comprises at least about 80% by weight chemically pulped fiber.

17. A packaging material prepared from multi-ply paperboard of claim 1.

18. The package material of claim 17 comprising folding boxboard.

19. An article comprising the packaging material of claim 17 and a packaged good.

20. The multi-ply paperboard of claim 1, wherein the paperboard is coated on at least one outer surface.

21. A multi-ply paperboard having at least three inner plies, wherein the inner plies together form a filter section having a first filler section side and a second filler section side, wherein the inner plies are derived from one or more inner ply fiber sources comprising at least about 80% by weight recycled fiber, wherein the paperboard has a MD stiffness value of from about 100 to about 1100 and a CD stiffness value of from about 50 to about 550 as measured by TAPPI method 489-om-92, and wherein the multi-ply paperboard is scorable.

22. A multi-ply paperboard having at least three inner plies, wherein the inner plies together form a filler section having a first filler section side and a second filler section side, wherein the inner plies are derived from one or more inner ply fiber sources comprising at least about 80% by weight recycled fiber, wherein the paperboard has a MD dry tear strength of from about 300 to about 900 and a CD dry tear strength of from about 300 to about 900 as measured by TAPPI method 414-om-88, and wherein the multi-ply paperboard is scorable.

23. A method for making a multi-ply paperboard having at least three inner plies comprising the steps of:
   a. introducing an inner ply pulp stock into at least one fourdrinier-type machine having a pulp stock instruction point, a forming fabric and an induction means wherein:
      i the pulp stock comprises water and an inner ply fiber derived from an inner ply fiber comprising at least about 80% by weight recycled fiber;
   b. directing the forming fabric away from the pulp stock introduction point;
   c. draining water from the pulp stock thereby providing at least one inner ply; and
   d. collecting the at least one inner ply with at least two additional inner plies to provide a filler section, wherein the filler section is suitable for use in a multi-ply paperboard having at least three inner plies,
wherein the pulp stock has a velocity A, the forming fabric has a velocity B and velocity A is greater than velocity B, wherein the multi-ply paperboard has a MD/CD stiffness ratio of from about 1.3 to about 2.3, wherein the MD and CD values providing the ratio are each measured by TAPPI method 489-om-92, and wherein the multi-ply paperboard is scorable.

24. The method of claim 23, wherein the induction means comprises one or more of: velocity induced drainage, activity lip, step foils or a lead-in dewatering element.

25. The method of claim 23, wherein the induction means comprises velocity induced drainage.

26. The method of claim 23, wherein one or more inner ply fiber sources are used to prepare the at least three inner plies and wherein the fiber sources each, independently, consist essentially of recycled fiber.

27. The method of claim 23, wherein one or more inner ply fiber sources are used to prepare the at least three inner plies and wherein the one or more fiber inner ply fiber sources, each, independently, comprise from about 75 to about 100% by weight chemically pulped fiber and from about 25 to about 0% by weight mechanically pulped fiber.

28. The method of claim 23, wherein the filler section has a first filler section surface and a second filler section surface, wherein a back liner is disposed proximal to the first filler section surface and a top liner is disposed proximal to the second filler section surface.

29. The method of claim 28, wherein the top liner and back liners are each, independently, derived from fiber sources comprising at least about 80% by weight recycled fiber.

30. The method of claim 29, wherein the fiber sources for either or both of the back liner or top liners each, independently, comprise at least about 80% softwood fiber.

31. The method of claim 29, wherein the back liner fiber source comprises at least about 80% by weight chemically pulped fiber.

32. The method of claim 29, wherein the top liner fiber source comprises from about 60 to about 95% by weight chemically pulped fiber and from about 40 to about 5% by weight mechanically pulped fiber.

33. The method of claim 23, wherein velocity A is from at least about 1% to about 10% greater than velocity B.

* * * * *